Figures 1, 2, 3:
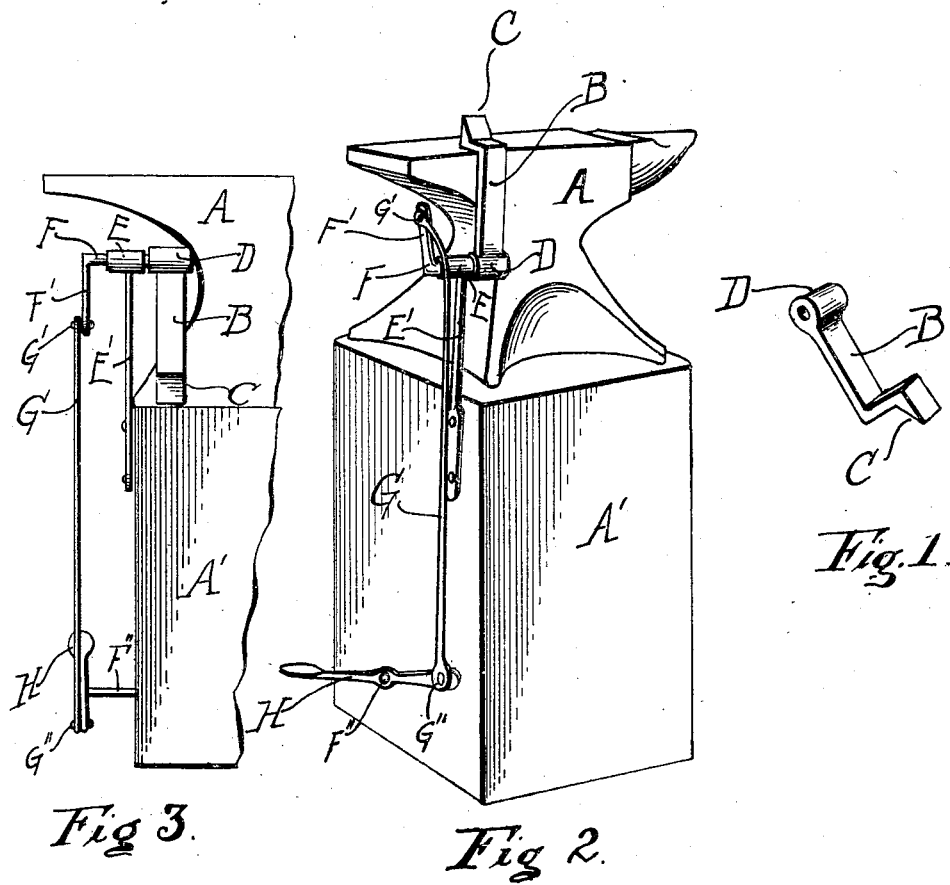

W. B. ROBESON.
BLACKSMITH'S HARDY.
APPLICATION FILED OCT. 26, 1905.

968,885.

Patented Aug. 30, 1910.

Witness
H. B. Smith
William C. Barber

Walter B. Robeson, Inventor
by John H. Garnsey,
his Attorney

UNITED STATES PATENT OFFICE.

WALTER B. ROBESON, OF JOLIET, ILLINOIS.

BLACKSMITH'S HARDY.

968,885.  Specification of Letters Patent.  Patented Aug. 30, 1910.

Application filed October 26, 1905. Serial No. 284,526.

*To all whom it may concern:*

Be it known that I, WALTER B. ROBESON, a citizen of the United States, residing at Joliet, Will county, Illinois, have invented a new and useful Blacksmith's Hardy, of which the following is a specification.

My invention relates to the device commonly known as a hardy, which in ordinary usage, is a removable cutter, consisting of a chisel-like piece of iron, having its lower portion constructed so as to admit of its being fastened into or upon an anvil, usually by being inserted in a square aperture in the flat end of the anvil. The office of the hardy, when in position, is to furnish a chisel upon which a piece of hot iron may be laid, and cut off with blows of the hammer. When the cutting is accomplished, it is customary to remove the hardy by hand, and lay it in the tool box at the side of the anvil. This also necessitates stopping operations, and reaching down for the hardy to put it in position whenever its use becomes necessary. Some time is always wasted thus, and, in addition, the hardy is frequently mislaid for the moment, and a delay ensues, during which the iron cools to some extent.

The object of my invention is to provide a hardy which will be always at hand, which will not require to be inserted in the anvil, and which may be brought into position and thrown out of use by the foot, in an instant's time. I attain these objects by the mechanism and construction herein set forth, and illustrated in the accompanying drawing, in which—

Figure 1 represents the hardy itself, Fig. 2 is a perspective view of an anvil showing the hardy in position and the operating levers, Fig. 3 is a front elevation showing the hardy dropped to the position assumed when not in use.

In the drawings, like letters indicate like parts.

The anvil base, A', is usually a heavy block of wood, round or irregular in shape, having a flat upper surface, on which is placed the anvil A. To the anvil base, A', I secure, preferably by an arm E' projecting upwardly and fastened to the base by any convenient means, a bearing, E. This bearing E may be secured to the base by any suitable means, though I prefer the arm or rod E' as the most convenient means for placing the bearing at the requisite height. Through the bearing E passes a shaft F, having a crank arm at one end, F'. To the other end of the shaft E, is secured the hardy B.

This hardy consists of metal, preferably tool steel, being in the shape of a bar originally. This bar is bent or cast in substantially L shape, and a bearing D is made at the end of the longer arm, while at the end of the shorter arm I make a cutting, or chisel edge C, perpendicular to the shorter arm. This chisel edge may be of any desired shape or height, and is on the outer surface of the short arm of the hardy. I secure the hardy B to the shaft F by any suitable means, such as a square bearing, a set-screw, or even a key.

To the end of the crank arm F' I secure a rod G by means of a pivot G'. This rod extends downwardly, is preferably curved out and away from the bearing E, as shown in Fig. 2, and at its lower end, by another pivot G'', I secure a foot lever, H. This foot lever is supported by a pivot F'' on the anvil base A'. All of these levers may be of lengths suitable to the size of the anvil and its height from the ground, but the distance of the bearing E from the upper surface of the anvil A must be such as to equal the distance from the shaft F to the lower surface of the short arm of the hardy B.

Normally, the position of my hardy is that shown in Fig. 3, that is, downward, and out of the way of the operator, the foot lever H being raised. When it is desired to use the hardy for cutting off a piece of metal, the end of a shoe, or any heated substance, the lever H is depressed by the foot, thus raising the lever rod G, and throwing the crank F' up. This revolves the shaft F, carrying with it the hardy B upward, when, if properly adjusted, the inner surface of the short arm will rest flat on the anvil, leaving the cutting edge C projecting upward in approximately the same position with relation to the anvil, as the ordinary style of removable hardy. When the operator is through with the hardy, a tap of the hammer will send it back to its normal position, raising the foot lever H again, placing the device in position for use another time.

As modifications of my invention may suggest themselves to one familiar with the art, I do not confine myself to the exact construction shown in the foregoing, but

What I claim as my invention and desire to secure by Letters Patent, is:—

1. A blacksmith's hardy, comprising a bar of suitable metal forming a right angle, having at one extremity a bearing, and having a relatively small portion of the other extremity projecting outwardly in the same plane but at right angles to the bar, said smaller portion carrying at its extremity a cutting edge.

2. In a blacksmith's hardy, in combination, an anvil base, a hardy comprising an L-shaped piece of metal having a bearing at one end and a cutting edge at the other, said cutting edge being upwardly projecting from the bar, a shaft secured at one end to said hardy and suitably supported by said anvil base, an actuating lever on the other end of said shaft, and means attached to said lever adapted to move said lever and said hardy, substantially as described.

In witness whereof I have signed my name to this specification in the presence of two subscribing witnesses.

WALTER B. ROBESON.

Witnesses:
JOHN H. GARNSEY,
H. B. SMITH.